A. E. GUY.
VOLUME INDICATING MECHANISM FOR CENTRIFUGAL PUMPS.
APPLICATION FILED FEB. 8, 1913.
1,083,610. Patented Jan. 6, 1914.
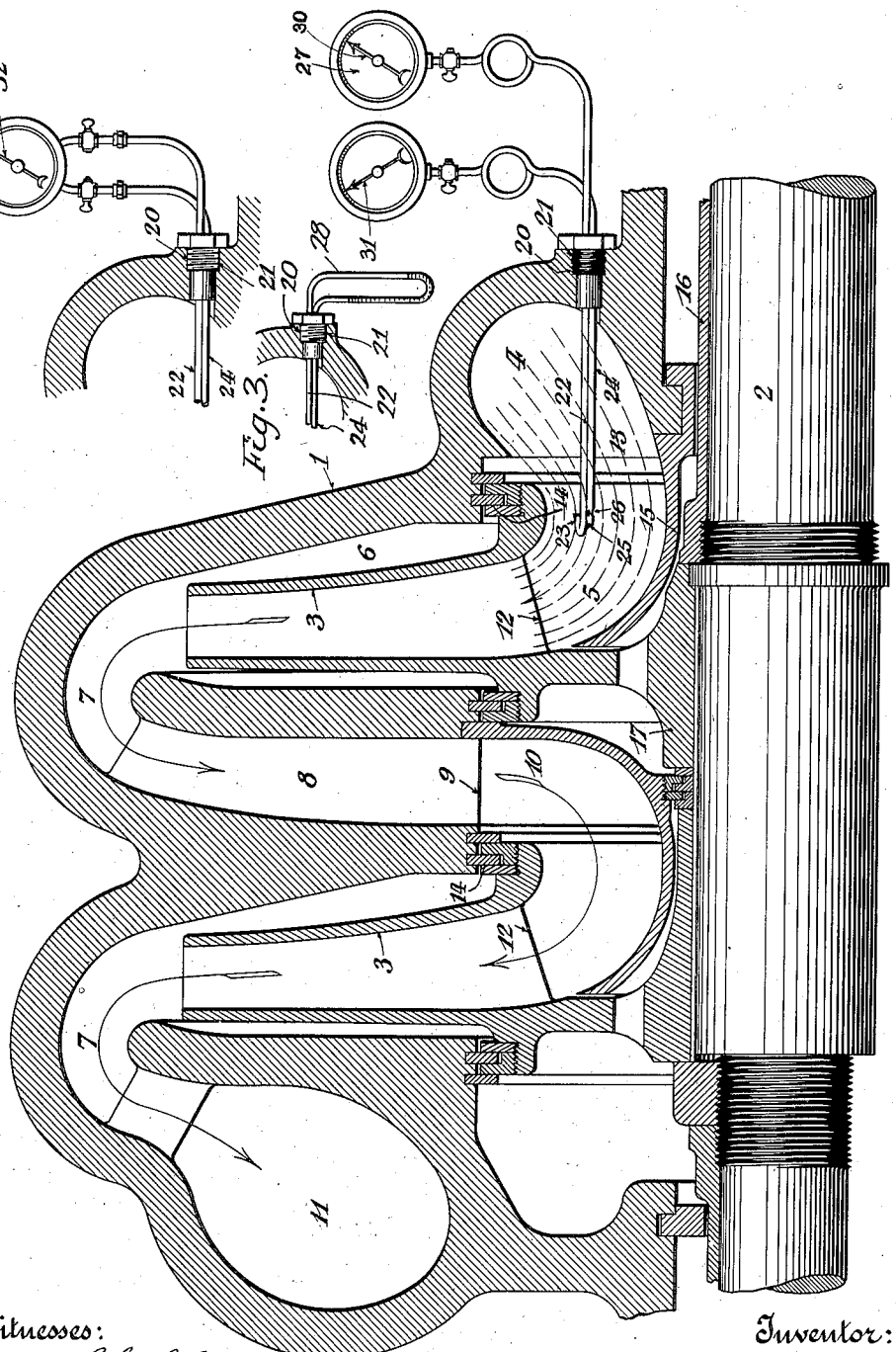

UNITED STATES PATENT OFFICE.

ALBERT E. GUY, OF PITTSBURGH, PENNSYLVANIA.

VOLUME-INDICATING MECHANISM FOR CENTRIFUGAL PUMPS.

1,083,610. Specification of Letters Patent. Patented Jan. 6, 1914.

Application filed February 8, 1913. Serial No. 747,072.

*To all whom it may concern:*

Be it known that I, ALBERT E. GUY, a resident of Pittsburgh, in the county of Allegheny and State of Pennsylvania, have invented a new and useful Improvement in Volume-Indicating Mechanism for Centrifugal Pumps, of which the following is a specification.

This invention relates to apparatus for measuring or indicating the volume of liquid delivered by centrifugal pumps, and has for its object to provide apparatus affording a constant and visible indication of the volume under running or operating conditions.

The problem of determining the volume of liquid traveling through or delivered by a centrifugal pump has always been a difficult one. By laboratory experiments, or by field tests, it has, of course, always been possible to set up a centrifugal pump with a test nozzle at the discharge end, and measure the actual water or other liquid delivered by the pump during a test run under given conditions. It is difficult, however, to reproduce for such a test the exact conditions of speed of operation, of water pressure, and other conditions encountered in actual practice, and the results of such a test even then afford only fixed basic quantities from which the actual volume delivered under working conditions can be approximately estimated. The Venturi meter has also been used, but aside from its cost, is requires considerable space for installation, so that it is not only beyond the reach of many pump users, but also is prohibited when the space available for the pump is restricted. Attempts have also been made to determine the volume passing through the pump by measurements of the velocity head in the inlet or discharge conduits leading to or from the pump. Such measurements, however, are unsatisfactory because the conduits mentioned, when of uniform internal diameter, do not produce a good or satisfactory nozzle effect, because the inside surfaces in contact with the moving liquid are cast and, therefore, not very smooth, and also, the liquid is in more or less turmoil and may be carrying some air therein, thus giving erroneous and unreliable measurements. Also, if such measurements are to have even the least reliability or accuracy, they must be taken at a considerable distance from the pump, to avoid the effects of the latter upon the liquid. This is impractical in many cases because the conduits are inaccessible.

The volume of liquid passing through any duct in a given unit of time is equal to the cross sectional area of the duct multiplied by the velocity of liquid per unit of time. The velocity per unit of time is equal to the square root of twice the gravity constant (32.18) multiplied by the velocity head. The latter quantity, the velocity head, depends entirely upon current impact and is determined by taking the difference between two measurements, made simultaneously, one by an ordinary pressure tube, of the static pressure, and the other by a Pitot tube, of the static pressure and velocity head. From the above it is clear that determination of the velocity head gives a direct indication of the volume per unit of time, since the latter quantity depends directly upon the velocity head and differs therefrom only by certain constants.

The present invention is particularly designed for securing at any time, or constantly, an accurate determination of the velocity head of the liquid traveling through a centrifugal pump, and consists in the application to a pump so constructed as to give a good nozzle effect, and thereby producing a dense column of liquid, of suitable measuring devices or apparatus, so located in the nozzle as to get the best results, said measuring devices being connected to indicating means calibrated either in inches of water, or in inches of mercury, but preferably in terms of volume per unit of time, such as gallons per minute.

In the drawings Figure 1 is an axial or longitudinal section through a centrifugal pump with my invention applied thereto; Fig. 2 is a detail view showing another arrangement of indicating means, and Fig. 3 is a similar view showing a modification.

The invention may be utilized with any suitable centrifugal pump, but preferably in connection with one where a portion of the surfaces contacted by the liquid traversing the pump gives a good nozzle effect; in other words, where the liquid is led quietly, smoothly and in compact form through a restricted passage, so that errors due to turmoil and air are overcome. The pump chosen for purposes of illustration, and illustrated in the drawings, is of ordinary construction, and particularly is of the form shown in my prior Patent No. 1,037,243, dated September 3, 1912. Briefly described, it comprises a pump casing 1 in which rotates an impeller shaft 2, upon which the impellers 3 are mounted. The pump casing 1 has on the suction side a main intake chamber 4, an inlet chamber 5, then an impeller chamber 6, followed by a return bend 7, delivering into the return passage 8. In said return passage 8 are ribs or vanes 9, the purpose of which is to guide the liquid centripetally into the inlet bend 10 leading to the next impeller. The return bend 7 of the last stage of the pump leads the liquid centripetally into a discharge chamber 11, provided with a suitable connection into the discharge main. The impellers 3 are provided with the usual radial vanes 12, between which the liquid travels centripetally. The passage 13 connecting the main intake chamber 4 to the vane inlet 12 of inlet chamber 5 is, in effect, an elbow, the cross section of which gradually converges from the intake chamber 4 inwardly, and is the smallest in a transverse plane taken substantially through the running joint 14 at the bend of the elbow. This is the plane of greatest constriction and is usually normal to the pump axis. The outer wall of the elbow is formed by the conoidal guide-shell 15, fixed to the stationary casing and surrounding the rotating shaft 2 and its protecting sleeve 16, or, in the other stages, the hub 17 of the previous impeller 3. These conoidal guide-shells form a smooth and effective guide for the liquid from the intake chamber 4 to the vane inlet 12, or, in the other stages, from the inlet chamber 10 to the vane inlet 12.

Threaded into a threaded bore 20 in the inlet end of the casing 1 is a hollow plug 21, through which project two small tubes or pipes. The first tube 22 is a Pitot tube, and has its inner end bent back upon itself, as at 23, so that the open end is directed toward the incoming stream. The second tube 24 is an ordinary pressure tube, having its extreme end closed, as at 25, and provided with one or more side ports or openings 26 therein. The tubes are held together by any suitable means in such manner that the ports or openings 26 are in line transversely of the stream with the open end of the Pitot tube 22. It will also be understood that any suitable means may be provided for packing the tubes 22 and 24 in the hollow plug 21 to prevent leakage of air into the pump. The tubes may, for example, be soldered into the plug.

The Pitot tube 22 and pressure tube 24 are of such length, and the bore 20 is so located in the casing, that the ends of the tubes lie in a plane through the running joints 14 and in the restricted portion or nozzle of the elbow 13. They are also so located that their ends lie in that portion of the stream where the liquid has mean velocity. This particular point will, of course, be determined by experiment.

The velocity head and static pressure at the intake chamber, and in the elbow 13, are usually low, and may even be below atmospheric pressure. Moreover, for a given variation in velocity per unit of time, there is considerable variation of velocity head in the intake chamber. For example, when the volume of liquid delivered is small, the velocity may be three feet per second, while when the volume delivered is at maximum, the velocity may be fifteen feet per second. Under these circumstances the pressure will vary between 14/100 feet and $3\frac{1}{2}$ feet of water column, giving a wide range and opportunity for very accurate measurement.

Any suitable means or apparatus may be connected to the tubes 22 and 24 for indicating the conditions under which the pump is running. For example, the Pitot tube 22 may be connected to an ordinary gage 27 having an indicator, such as the pointer 30, controlled by a diaphragm or the like (not shown), and subject to the pressure in the tube, for indicating static pressure and velocity head in terms of inches of water or mercury. A similar gage, such as gage 31, may be provided for indicating the pressure at the end of the tube 24. Preferably, however, the tubes 22 and 24 are connected to the indicating mechanism, so as to oppose each other, as in Fig. 2, where the pointer is controlled by a diaphragm subject on one side to the pressure in tube 22 and on the other side to the pressure in tube 24. Instead of the ordinary diaphragm gages just referred to, water or mercury gages may be used, such an arrangement being shown in Fig. 3, where the gage consists of a U tube 28 filled with water or mercury, the opposite ends of the tube being connected respectively to the tubes 22 and 24 and subject to the pressure therein. With both of the forms shown in Figs. 2 and 3 the indicator, either the column of water or mercury, or the hand moving over the dial, gives a direct reading of the difference in pressure in the two tubes 22 and 24.

The scale traversed by the pointer 32 may be calibrated to read either in terms of inches of water or inches of mercury, but preferably is calibrated in terms of volume delivered by the pump per unit of time, such as in gallons per minute. These latter calibrations must, of course, be made specially for each pump, since one factor in the computations is the area of cross section of the duct, which in this case is the elbow 13, and will vary with different pumps.

What I claim is:

1. The combination with a centrifugal pump comprising a casing provided with an intake passage gradually constricted so as to form an annular nozzle and having an impeller chamber and a shaft rotatable in said casing and carrying an impeller in said impeller chamber, of means having a portion located in the plane of maximum constriction of said intake passage and there subject to the influence of the current flowing through said nozzle for measuring the volume of liquid traveling through said pump.

2. The combination with a centrifugal pump comprising a casing provided with an intake passage gradually constricted so as to form an annular nozzle and having an impeller chamber and a shaft rotatable in said casing and carrying an impeller in said impeller chamber, of means for indicating the volume of liquid traveling through said pump, comprising a pressure tube and a Pitot tube having their inner end portions lying in the plane of maximum constriction of said intake passage and open to the influence of the current flowing through said nozzle.

3. The combination with a centrifugal pump comprising a casing provided with an intake passage gradually constricted so as to form an annular nozzle and having an impeller chamber and a shaft rotatable in said casing and carrying an impeller in said impeller chamber, of a pressure tube and a Pitot tube projecting through the wall of said casing and having their inner end portions lying in the plane of maximum constriction of said intake passage and open to the influence of the current flowing through said nozzle, and indicating means communicating with said tubes and actuated thereby.

4. The combination with a centrifugal pump comprising a casing provided with an intake passage gradually constricted so as to form an annular nozzle and having an impeller chamber and a shaft rotatable in said casing and carrying an impeller in said impeller chamber, of a stationary conoidal guide-shell extending from the intake chamber toward said impeller and serving as a wall of a gradually constricted duct or nozzle having the maximum constriction thereof in a plane normal to the pump axis, and means having a portion lying in said plane and there subject to the influence of the current flowing through said duct or nozzle for indicating the volume of liquid traveling through said pump.

5. The combination with a centrifugal pump comprising a casing provided with an intake passage gradually constricted so as to form an annular nozzle and having an impeller chamber and a shaft rotatable in said casing and carrying an impeller in said impeller chamber, of a stationary conoidal guide-shell extending from the intake chamber toward said impeller and serving as a wall of a gradually constricted duct or nozzle having the maximum constriction thereof in a plane normal to the pump axis, and means for indicating the volume of liquid traveling through said pump, comprising a pressure tube and a Pitot tube having their end portions lying in said plane and open to the influence of the current flowing through said duct or nozzle.

6. The combination with a centrifugal pump comprising a casing provided with an intake passage gradually constricted so as to form an annular nozzle and having an impeller chamber and a shaft rotatable in said casing and carrying an impeller in said impeller chamber, of a stationary conoidal guide-shell extending from the intake chamber toward said impeller and serving as a wall of a gradually constricted duct or nozzle having the maximum constriction thereof in a plane normal to the pump axis, a pressure tube and a Pitot tube projecting through the wall of said casing with their inner end portions lying in said plane and open to the influence of the current flowing through said duct or nozzle, and means communicating with said tubes and actuated thereby for indicating the volume of liquid traveling through said pump.

In testimony whereof, I have hereunto set my hand.

ALBERT E. GUY.

Witnesses:
 ELBERT L. HYDE,
 WM. P. LARKIN.